US006926108B1

(12) United States Patent  
Polakowski et al.

(10) Patent No.: US 6,926,108 B1
(45) Date of Patent: Aug. 9, 2005

(54) SNOWMOBILE REAR SUSPENSION SYSTEM

(75) Inventors: Stephen E. Polakowski, Haughton, MI (US); Steven G. Mattson, Haughton, MI (US)

(73) Assignee: Great Lakes Sound & Vibration, Inc., Houghton, MI (US)

( * ) Notice: Subject to any disclaimer, the term of this patent is extended or adjusted under 35 U.S.C. 154(b) by 0 days.

(21) Appl. No.: 10/654,195

(22) Filed: Sep. 3, 2003

Related U.S. Application Data

(60) Provisional application No. 60/407,913, filed on Sep. 3, 2002.

(51) Int. Cl.$^7$ ............................................. B62M 27/00
(52) U.S. Cl. ..................................... 180/190; 180/192
(58) Field of Search ............................... 180/190, 193; 305/127, 128

(56) References Cited

U.S. PATENT DOCUMENTS

| | | | | |
|---|---|---|---|---|
| 1,916,375 A | * | 7/1933 | Knickerbocker | 180/192 |
| 3,773,126 A | * | 11/1973 | Irvine | 180/9.58 |
| 3,840,083 A | * | 10/1974 | Woods | 180/312 |
| 3,879,092 A | * | 4/1975 | Rose | 305/127 |
| 3,887,023 A | * | 6/1975 | Henning | 180/192 |
| 4,407,386 A | | 10/1983 | Yasui et al. | |
| 5,014,805 A | | 5/1991 | Uchida | |
| 5,113,958 A | | 5/1992 | Holden | |
| 5,667,031 A | | 9/1997 | Karpik | |
| 5,727,643 A | | 3/1998 | Kawano et al. | |
| 5,860,486 A | | 1/1999 | Boivin et al. | |
| 5,881,834 A | | 3/1999 | Karpik | |
| 5,944,134 A | | 8/1999 | Peppel et al. | |
| 6,032,752 A | | 3/2000 | Karpik et al. | |
| 6,032,754 A | | 3/2000 | Izumi et al. | |
| 6,070,683 A | | 6/2000 | Izumi et al. | |
| 6,234,263 B1 | | 5/2001 | Boivin et al. | |
| 6,234,264 B1 | | 5/2001 | Boivin et al. | |
| 6,237,706 B1 | | 5/2001 | Karpik et al. | |
| 6,263,991 B1 | | 7/2001 | Savage et al. | |
| 6,321,864 B1 | | 11/2001 | Forbes | |
| 6,354,389 B1 | | 3/2002 | Zaczkowski et al. | |
| 6,357,543 B1 | | 3/2002 | Karpik | |
| 6,390,219 B1 | | 5/2002 | Vaisanen | |
| 6,394,204 B1 | | 5/2002 | Haringer | |
| 6,502,651 B2 | | 1/2003 | Zaczkowski et al. | |
| RE38,124 E | | 5/2003 | Mallette et al. | |
| 6,631,778 B2 | | 10/2003 | Mallette | |

OTHER PUBLICATIONS

Kaduce, Larry A., Scorpion and Trailroamer Bite The Dust; Aug., 1, 2001, http://www.grovetontrailblazers.com/news/trailroamer1.htm, pp. 1-3, last visited on Oct. 1, 2002 10:52 AM.

Track Suspension Today, The Adjustables, Part I: Origin & Nomenclature; Supertrax International, Fall 2002, pp. 45-49.

Trail Roamer, Marine Hunting and Outdoor Magazine, pp. 1-3, http://www.sportingjournal.com/main18.shtml, last visited Oct. 1, 2002.

* cited by examiner

*Primary Examiner*—Kevin Hurley
(74) *Attorney, Agent, or Firm*—Andrus, Sceales, Starke & Sawall, LLP

(57) ABSTRACT

A rear suspension system for a snowmobile includes a plurality of adjacent closed-loop tracks disposed in a rear tunnel of the snowmobile. Each of the plurality of adjacent closed-loop tracks are rotatably driven by a drive system. One of a plurality of independent suspension assemblies is disposed in each closed-loop track and the plurality of independent suspension assemblies articulate independently of each other during travel of the rear suspension system.

23 Claims, 11 Drawing Sheets

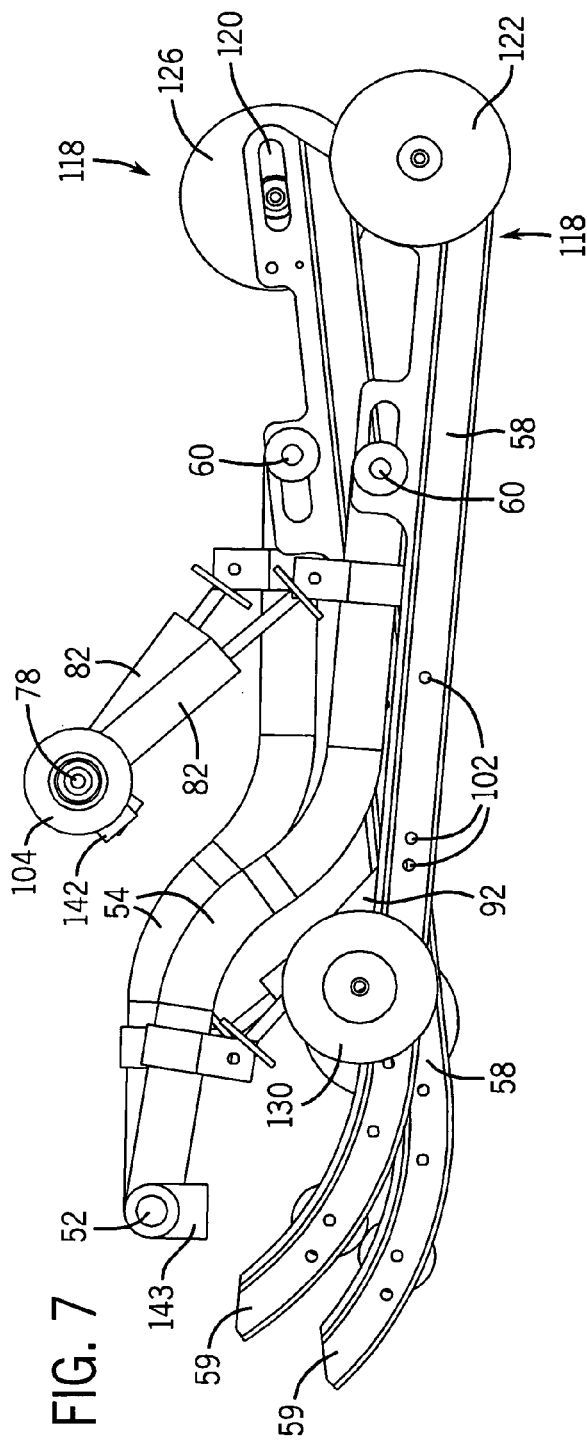
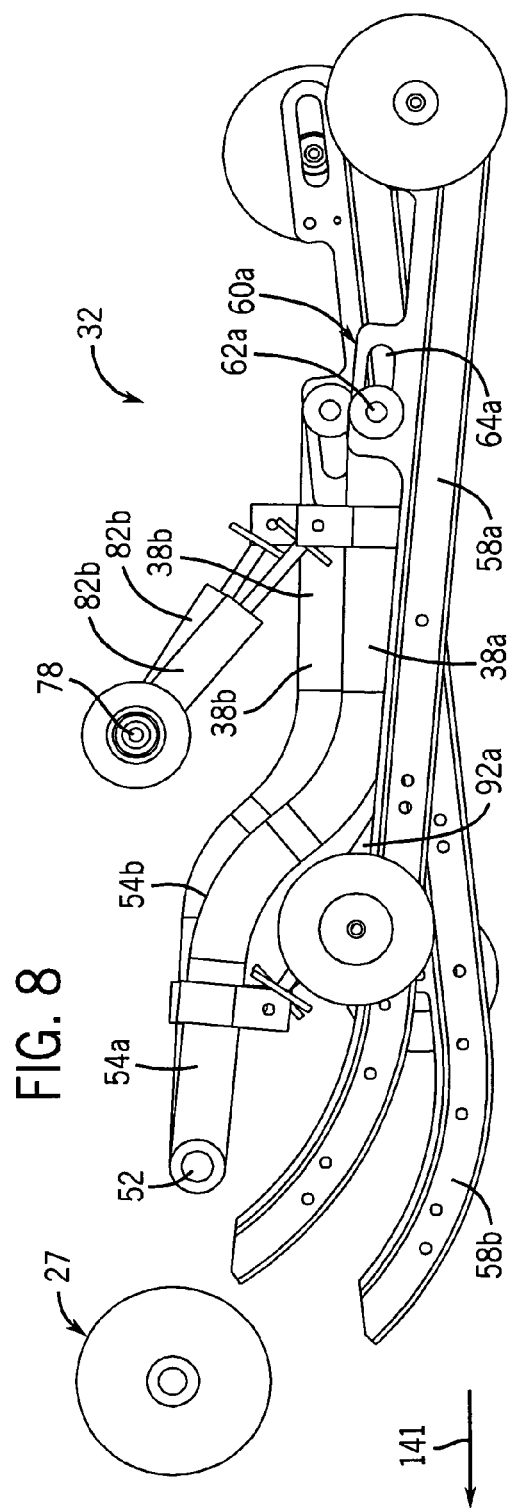
FIG. 7
FIG. 8

SNOWMOBILE REAR SUSPENSION SYSTEM

CROSS REFERENCE TO RELATED APPLICATIONS

This application claims the benefit of U.S. Provisional Application No. 60/407,913, filed Sep. 3, 2002.

FIELD OF THE INVENTION

The present invention relates to a suspension system. In particular, the present invention relates to an independent rear suspension system for a snowmobile.

BACKGROUND OF THE INVENTION

Historically, snowmobiles having multiple rear tracks have been limited in manufacture and use. As such, suspension systems for such arrangements have also been limited in manufacture and use. An example of a known suspension system for a snowmobile having multiple rear tracks is taught by Uchida U.S. Pat. No. 5,014,805. Historically, snowmobile suspension assemblies such as the Uchida '805 suspension assembly were typically designed for traversing flat terrain and as such were not designed for or used much in mountain or hill climb environments. The Uchida '805 suspension assembly resides within dual rear tracks and includes a suspended frame structure to which rollers are rotatably mounted. The assembly is mounted to the frame by various arms and linkages that define the suspension travel and allow the tracks to move up and down relative to the vehicle. The dual rear tracks are located on each side of the snowmobile and are spaced apart outside of the elongated saddle seat, on the outboard sides of the vehicle. The rear tracks are separated by a power train, including an engine and a drive train. In addition, a muffler system and an air cleaner and carburetor are located between the tracks. Disc brakes are applied to axles disposed transversely through the dual rear tracks.

Over the years, the basic design of snowmobiles has significantly changed from that disclosed in Uchida '805. Snowmobiles have more commonly been designed using a single driven inboard closed-loop rear track typically located in a 17-inch width or narrower tunnel beneath the rear portion of the snowmobile chassis. Contrary to the Uchida '805 snowmobile, the engine and drive train for snowmobiles are now typically positioned towards the front portion of the vehicle. The track typically rides along a plurality of rails and idler wheels and is driven by a single drive shaft located near the front portion of the track.

Upon this single-track arrangement, many developments and improvements related to rear suspension systems have occurred. Each of these improvements has been particularly geared towards the use of a single driven, suspended track and each typically includes various suspension components such as shocks, springs, coupling devices and front and/or rear linkages. For example, Yasui et al U.S. Pat. No. 4,407,386 teaches a rear suspension system which comprises both front and rear suspension assemblies connected to a pair of spaced apart guide rails. The guide rails carry spaced rollers and backup a single drive track. A series of linkages, shocks and springs move relative to each other to resiliently support and dampen the movement of the drive track and soften the ride of the snowmobile.

Boivin et al U.S. Pat. No. 5,860,486 relates to a rear suspension system for a snowmobile that has a pair of primary pivoting arms that interconnect a series of rails with the undercarriage of the snowmobile chassis. Primary suspension means and secondary suspension means are mounted to a first horizontal bar and a second horizontal bar respectively to support a single track and the weight of the vehicle. The various linkages, suspension means and pivoting arms cooperate to create a softer ride and accommodate weight transfer on the snowmobile.

Savage et al U.S. Pat. No. 6,263,991 relates to a rear suspension for a snowmobile which includes two elongated members of substantially constant length coupled to the snowmobile frame and to a single endless track guide rail assembly. The suspension keeps the guide rail assembly at a substantially constant angular orientation relative to the frame for improved performance and operator comfort.

Boivin et al U.S. Pat. No. 6,234,264 also relates to a snowmobile suspension system which includes front and rear suspension arms connected to side rails and a biasing assembly, all of which are configured to suspend a single drive track on a snowmobile while providing a smoother ride.

However, the single-track arrangement of the prior art has many disadvantages. For example, when operating a snowmobile in mountain terrain, the snowmobile is commonly required to traverse the side of a steep hill. To maintain a snowmobile having a single suspended track at a level position, the operator positions both feet on one running board such that the entire weight of the snowmobile bears on one edge of the single track. This requires a great effort on behalf of the operator. It also results in minimized floatation and performance, which is a result of large pressures on one edge of the track and a minimal contact area that minimizes traction and the ability to apply power to the ground.

Another disadvantage with single track suspensions is found in hill climb racing, where an operator drives the snowmobile up a steep hill that is covered with moguls. As the snowmobile traverses the hill, the snowmobile is propelled off of moguls and typically lands in an uneven vehicle roll position. In conventional single track snowmobile suspensions this activity results in high moments into the vehicle that tend to pitch the rider.

It is therefore highly desirable to provide an independent suspension system for a snowmobile that is capable of supporting the snowmobile while independently articulating multiple rear tracks through a defined suspension travel. It is desirable to provide an independent suspension system that is simple, easy to construct and requires minimal parts, thus minimizing mechanical breakdown. It is further desirable to provide an independent suspension system that is adjustable and that maximizes performance while minimizing overall system weight. It is also desirable to provide such an independent suspension system that is sized to occupy and operate within a 17-inch or narrower tunnel beneath the snowmobile seat.

SUMMARY OF THE INVENTION

The present invention relates to such an independent suspension system for a snowmobile which is capable of supporting the snowmobile while independently articulating multiple rear tracks through a defined suspension travel. The independent suspension system is simple, easy to manufacture and requires minimal parts, minimizing mechanical breakdown. The independent suspension system maximizes performance and minimizes overall system weight. Further, the independent suspension system can optionally be built to fit and operate within a 17-inch or narrower tunnel beneath a snowmobile seat.

In the preferred embodiment of the invention, a plurality of adjacent closed-loop tracks are disposed in a rear tunnel of a snowmobile having an elongated chassis. Each of the plurality of adjacent closed-loop tracks are rotatably driven by a drive system. One of a plurality of independent suspension assemblies is disposed in each closed-loop track. The plurality of independent suspension assemblies articulate independently of each other during suspension travel of the rear suspension system.

The plurality of closed-loop tracks are driven by a drive system. A front elongated cross shaft extends transversely through the plurality of closed-loop tracks and is coupled to the chassis. The plurality of independent suspension assemblies are coupled to the front cross shaft and the front cross shaft provides a centerline of rotation for the plurality of independent suspension assemblies. A rear elongated cross shaft extends transversely through the plurality of closed-loop tracks and is coupled to the chassis. The plurality of independent suspension assemblies are coupled to the rear cross shaft and the rear cross shaft provides a centerline of rotation for the plurality of independent suspension assemblies.

The rear suspension system employs a plurality of elongated ground contacts, and preferably two ground contacts per independent suspension assembly. Each independent suspension assembly employs an elongated swing arm, which is coupled to and rotates about the front cross shaft and is further coupled to the pair of ground contacts. A tensioner adjustably couples the swing arm to the pair of ground contacts such that the tensioner is independently extendable and retractable during articulation of the plurality of independent suspension assemblies.

Front and rear resilient members are disposed in each independent suspension assembly. The front resilient member biases independently against displacement between the swing arm and the ground contacts during rear suspension system travel and dampens movement of the tracks to create a softer ride. The rear resilient member biases independently against displacement between the second cross shaft and the swing arm during rear suspension system travel and dampens movement of the tracks to create a softer ride.

Unique from the teachings of the prior art, the present invention recognizes that it is desirable to provide a rear suspension system adapted to independently suspend a plurality of driven tracks, which tracks are preferably adjacent and disposed in the tunnel beneath the rear portion of the chassis of the vehicle. Such an arrangement presents many desirable results. For example, this arrangement allows one side or corner of the suspension to deflect and begin to absorb shock to a point where the second side is engaged. This eliminates roll moments and reduces shock imposed on the snowmobile and rider. In turn, this minimizes rider fatigue and maximizes rider control. In addition, the present invention maximizes traction because more track area is applied to the ground as the suspension displaces independently.

The independent rear suspension system also provides desirable results for other non-mountain style riding conditions. For example, by utilizing a plurality of independently suspended tracks instead of a single suspended track, additional maneuverability and control is provided to the vehicle in trail riding conditions. This is especially true when the vehicle is traveling at higher speeds or contacting rough terrain. At high rates of speed the vehicle is often airborne or "light on the track". Regaining ground contact with a single-track suspension often yields violent rider motions. Contrary to the prior art, the present invention maximizes control and minimizes rider motion as the ground inputs are absorbed with independent motion.

The present invention further increases control and maneuverability by reducing the restoring moment that is created by the geometry and width of prior art single-track suspension systems. Single-track suspension geometry and design is focused on vertical displacements. A large moment about the snowmobile fore/aft axis occurs when ground inputs are encountered by the suspension system unevenly about the centerline of the track area. This moment is also encountered when an operator imparts a force and applies weight to direct, or lean, the snowmobile into or out of a particular path of travel. Known single-track suspension designs do not provide a rotational degree of freedom about the fore/aft axis and therefore non-vertical inputs highly influence and stress these systems. In contrast, the present invention improves maneuverability by adapting to both rough terrain and operator inputs.

The effects of independent motion found in the present invention also improve cornering over rough terrain, where the track contact area is exposed to uneven loading. For example, during cornering bumps or banks often impact the suspension system on only one side. The present invention minimizes abrupt tipping due to such side impacts, reduces "skipping" by providing rotational absorption, and increases traction as pressure is more evenly applied across the entire track area (defined for example by two adjacent tracks).

In all conditions, the independent suspension system allows more contact between the track area and ground, which provides increased traction. It has been observed that independent motion occurs even on terrain that appears relatively flat with bumps that are formed normal to the trail. In a single-track suspension these motions cannot occur. As a result, the present invention reduces loads that are imparted on the suspension, snowmobile, and operator. This results in increased comfort, improved durability, and lighter components.

It is also recognized that utilizing separate independently suspended tracks affords the ability to offset the track lugs, grouser bars and track clips on adjacent tracks, reducing noise and vibration and producing a smoother quieter ride.

Other objects, advantages and features of the rear suspension system will become more apparent after reading the following detailed description of the preferred embodiments, given by way of example only with reference to the accompanying drawings.

BRIEF DESCRIPTION OF THE DRAWINGS

FIG. 7 is a side view of the rear suspension system independently articulating a pair of independent suspension assemblies.

FIG. 8 is a side view of the drive shaft and the rear suspension system that independently articulates the pair of independent suspension assemblies.

FIG. 12 is a perspective view of the rear suspension system shown in FIG. 10 having stops formed on the front and rear cross shafts.

DETAILED DESCRIPTION OF THE PREFERRED EMBODIMENT

The present invention relates generally to a rear suspension system for a snowmobile. Preferred embodiments of the invention are described in the following specification and depicted in the attached drawings. It should be understood that the drawings and specification are to be considered an exemplification of the principles of the invention, which is more particularly defined in the appended claims. The specification and drawings are not intended to limit the broad aspects of the invention to the embodiment illustrated. For example, although a snowmobile having a pair of independent suspension assemblies is discussed below, it is recognized that under the inventive concepts of the invention, a snowmobile having three or more independent suspension assemblies is conceived.

Figure 1:
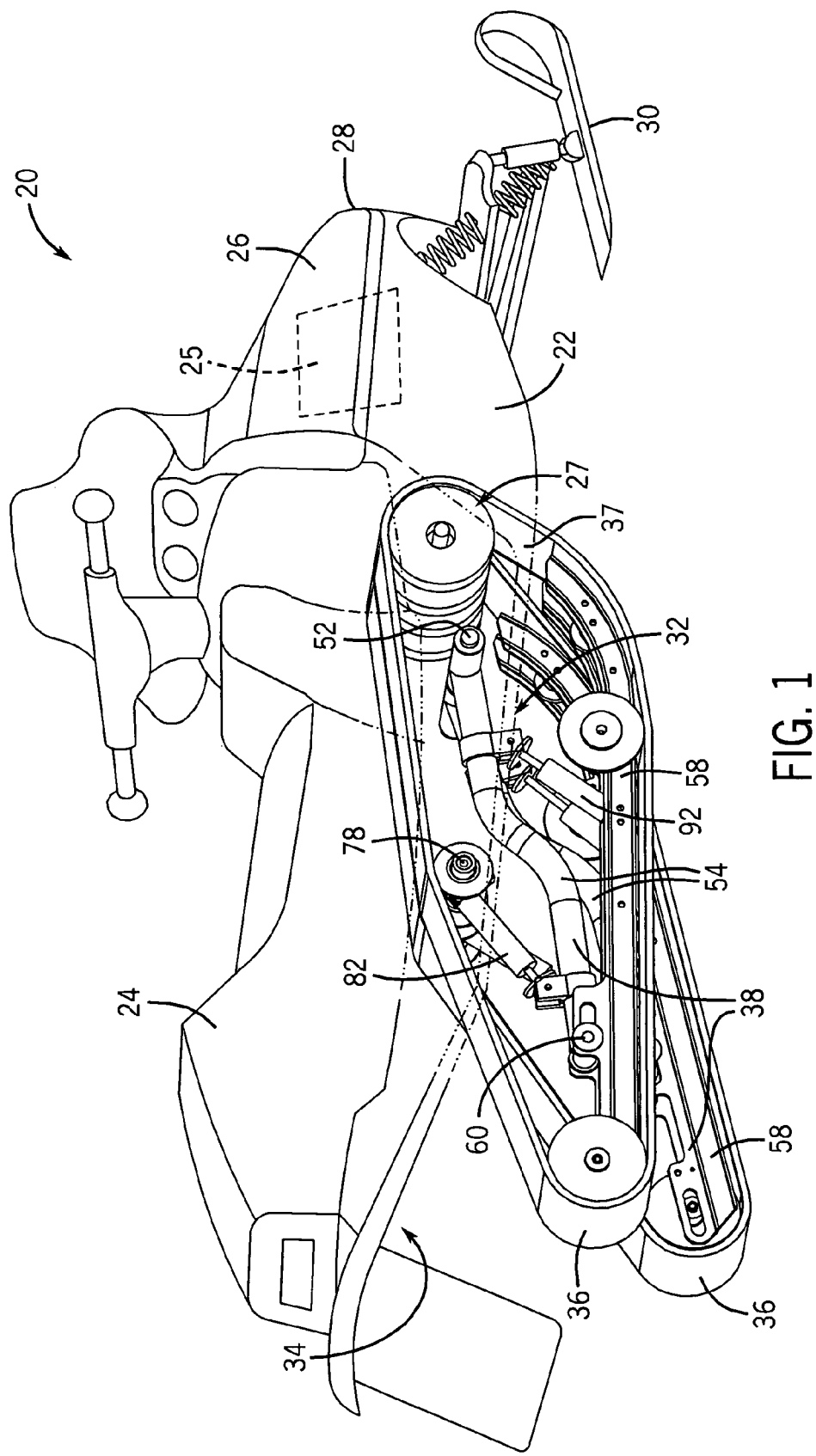
FIG. 1 is a right rear perspective view of the rear suspension system of the present invention mounted in a rear tunnel of a snowmobile.

As shown in FIG. 1, a snowmobile 20 has a chassis 22 with an elongated saddle seat 24. A power plant/engine is shown in dashed line at 25 and is located beneath engine cowling 26 at the front 28 of the snowmobile 20, which is supported by a fore-located ground contacts 30. The engine 25 drives the drive system 27 in rotation, which in turn drives a pair of adjacent closed-loop tracks 36 in a selected rotational direction to propel the snowmobile in a desired direction. As will be described below in more detail, the drive system 27 may include means to drive the pair of adjacent closed-loop tracks 36 at the same speed, or may include means to selectively drive the individual closed-loop tracks 36 at different speeds to aid in operational maneuvers, such as turning.

An independent rear suspension system 32 is disposed in the rear tunnel 34 of the snowmobile 20 beneath the saddle seat 24. The independent suspension system 32 comprises various linkages and other components which will be structurally described in detail below, followed by a description of the functional interrelation thereof.

In general, the rear suspension system 32 includes the pair of adjacent closed-loop tracks 36, which are rotatably driven by the drive system 27. In addition, the rear suspension system 32 includes a pair of independent suspension assemblies 38, one disposed in each respective closed-loop track 36. The independent suspension assemblies 38 articulate independently from each other during travel of the rear suspension system 32, as will be described in detail below.

Figure 2:
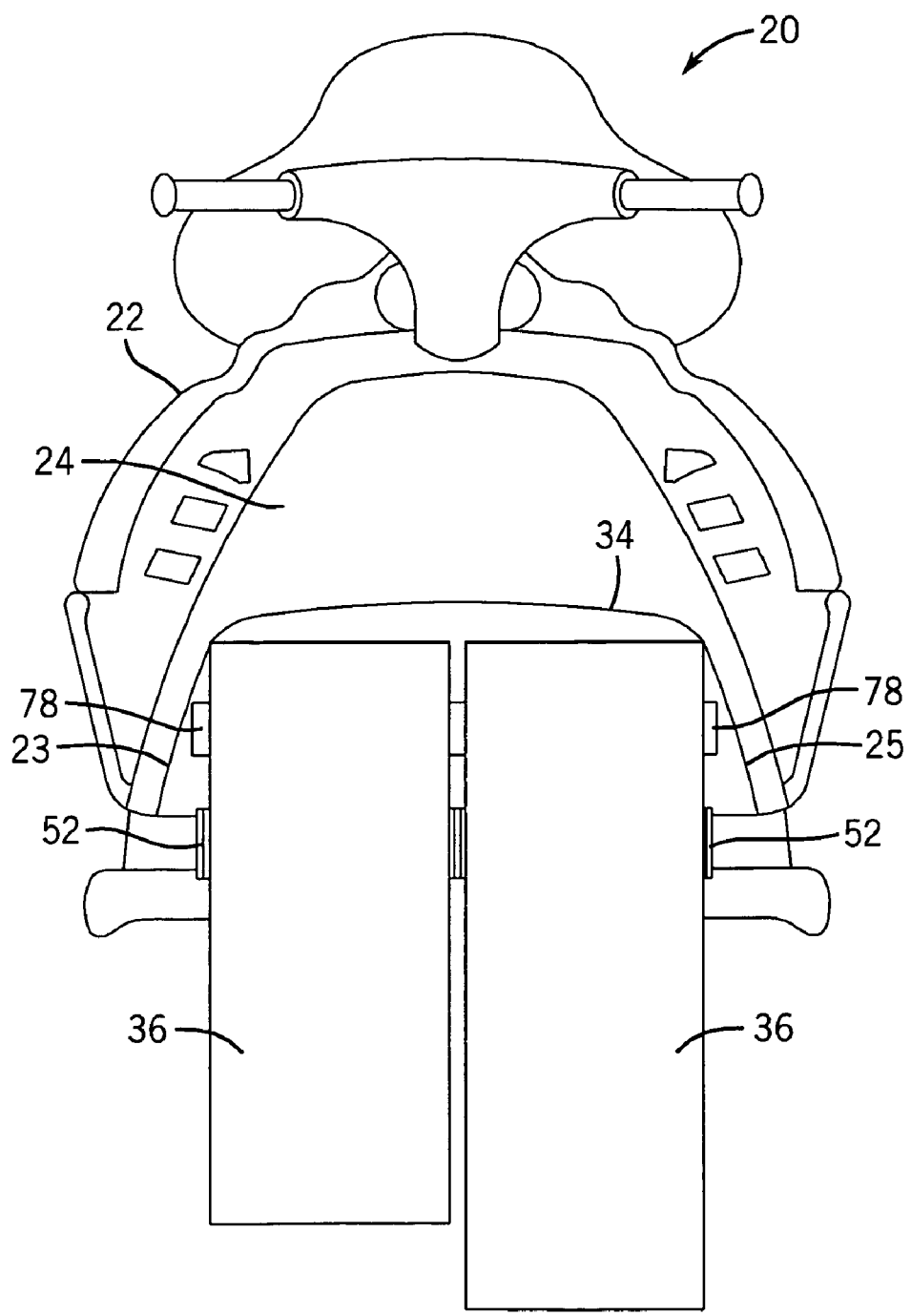
FIG. 2 is a rear view of the rear suspension system mounted in the rear tunnel.

Referring to FIG. 2, the pair of closed-loop tracks 36 are adjacent each other and are each rotatably driven by the drive system 27 within the rear tunnel 34 of the chassis 22 of the snowmobile 20. Preferably, the total combined width of the adjacent closed-loop tracks 36 is less than or equal to 17 inches, however a track width greater than 17 inches is also conceived by the present invention. The rear tunnel 34 has a left inboard side 23 and a right inboard side 25.

Figure 3:
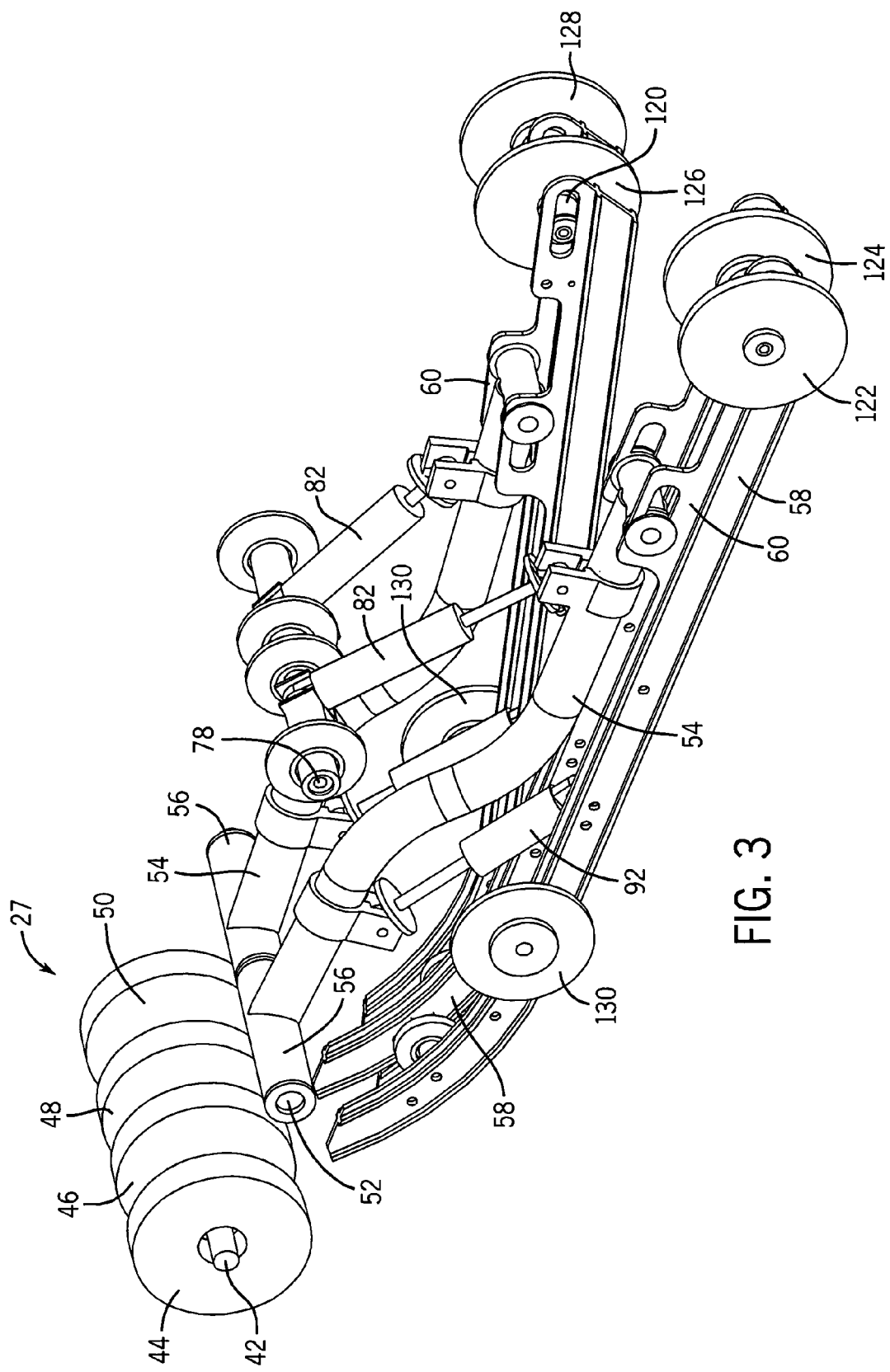
FIG. 3 is a left rear perspective view of the rear suspension system having the closed-loop tracks removed.

Referring to FIG. 3, in the presently described embodiment, the drive system 27 includes a driveshaft 42 upon which a plurality of drive wheels are mounted. Specifically, left outboard drive wheel 44, left inboard drive wheel 46, right inboard drive wheel 48 and right outboard drive wheel 50 are rotatably driven by the driveshaft 42. Each pair of drive wheels 44, 46 and 48, 50 drive the left and right closed-loop tracks 36 respectively, in rotation to propel the snowmobile 20 in a forward or rearward direction.

Figure 4:
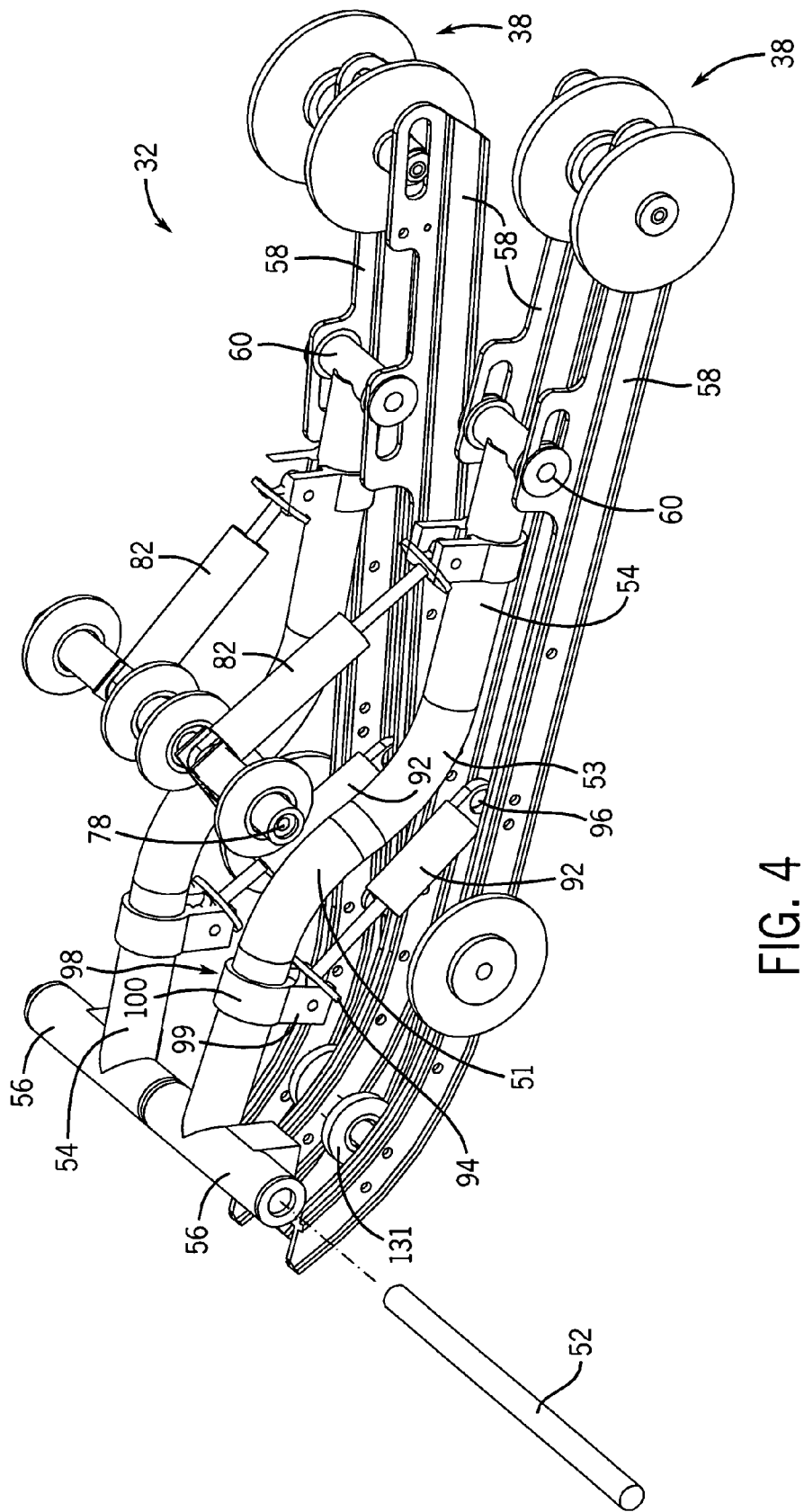
FIG. 4 is a left rear exploded view of the rear suspension system and front elongated cross shaft.

Referring to both FIGS. 2 and 4, the rear suspension system 32 employs a front elongated cross shaft 52 (shown in exploded view on FIG. 4) extending transversely through the pair of closed-loop tracks 36. Front cross shaft 52 is coupled to the chassis 22 on the left inboard side 23 and right inboard side 25 of the rear tunnel 34 (FIG. 2). Preferably, front cross shaft 52 is cylindrical and has an outer diameter of between 1 and 2 inches. As will be described further below, front cross shaft 52 provides a centerline of rotation for the pair of independent suspension assemblies 38.

Figure 6:
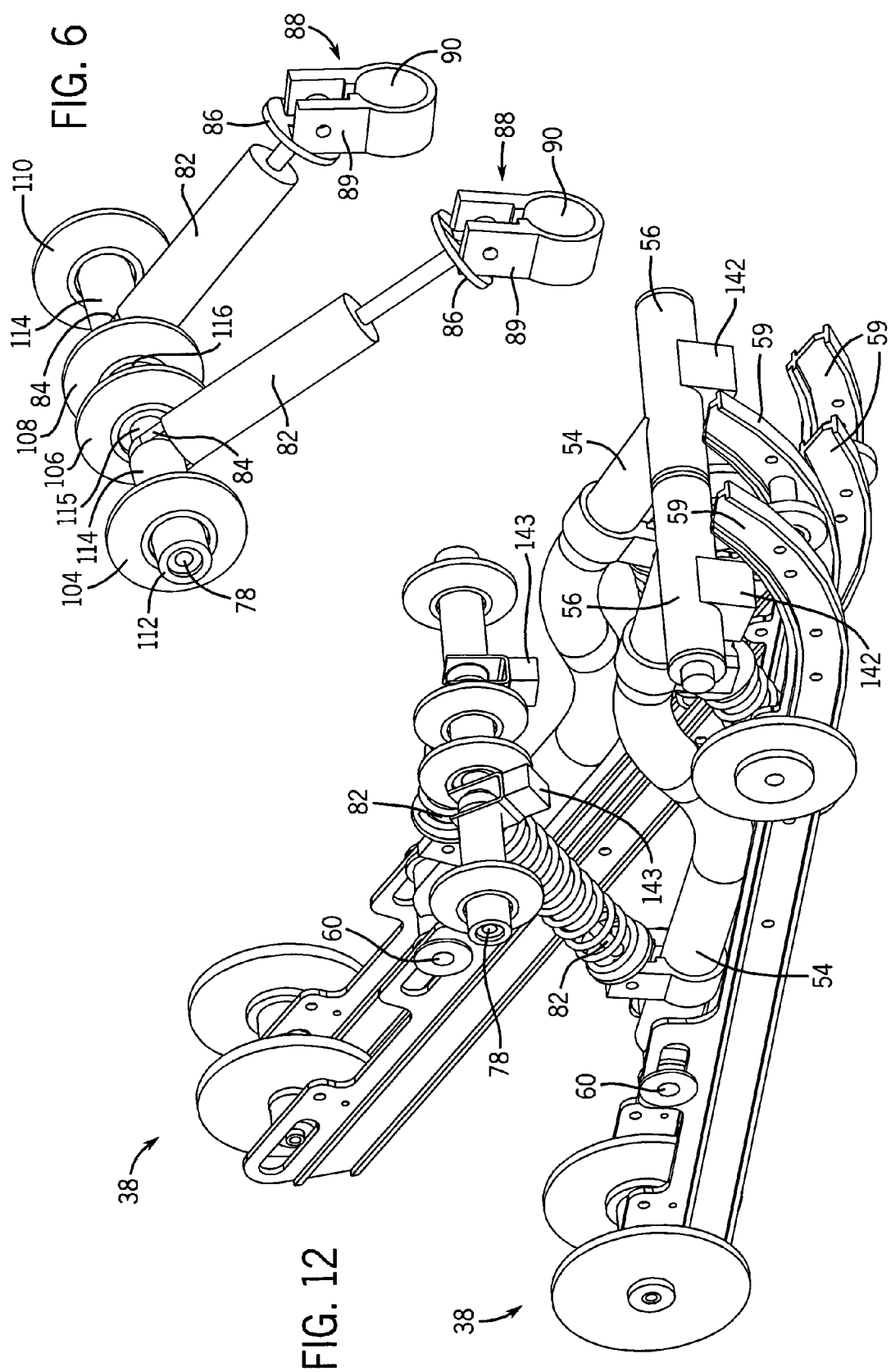
FIG. 6 is a left rear perspective view of the rear elongated cross shaft and a pair of rear resilient members rotatably coupled thereto.

Referring to both FIGS. 2 and 6, the rear suspension system 32 also employs a rear elongated cross shaft 78, which also extends transversely through the pair of closed-loop tracks 36 and is coupled to the left inboard side 23 and right inboard side 25 at the rear of tunnel 34 of the snowmobile 20 (FIG. 2). Preferably, rear cross shaft 78 is cylindrical and has an outer diameter of between 1 and 2 inches. As will be described further below, rear cross shaft 78 provides a centerline of rotation for the pair of independent suspension assemblies 38.

Returning to FIG. 4, each suspension assembly 38 has a suspension linkage or swing arm 54, which is rotatably coupled to and independently articulates about the front cross shaft 52. Each swing arm 54 has a respective transverse sleeve 56 sized to rotatably receive the front cross shaft 52. The transverse sleeve 56 is rotatably coupled to the front cross shaft 52 via opposing bushings 57 (see FIG. 5). The swing arm 54 is preferably between 16 and 36 inches long, extends transversely from the front cross shaft 52, to a first downward curved portion 51, then to a second upward curved portion 53 and then rearwardly. However the swing arm may comprise a variety of shapes and sizes. During suspension travel, the independently articulating swing arm 54 transfers suspension weight and moment amongst various independent linkages to support the snowmobile 20 and provide a smooth ride. The functional interrelation between these various suspension components will be described in detail below.

Referring now to FIG. 7, each suspension assembly 38 has a pair of elongated ground contacts, or skid rails 58, upon which the pair of closed-loop tracks 36 rotate. Although in the preferred embodiment a pair of ground contacts 58 are employed, it is conceived that each suspension assembly 38 could employ a single ground contact or three or more ground contacts. The ground contacts 58 are longitudinal members having curved fore end tips 59 and each ground contact 58 resides within a closed-loop track 36. As the closed-loop tracks 36 are driven in rotation by the drive system 27, the inner surface 37 (FIG. 1) of the closed-loop tracks 36 slides along the longitudinal length of the ground contacts 58. Bearing the weight of the snowmobile 20, the ground contacts 58 apply pressure to the inner surface 37 of the closed-loop tracks 36 and in turn apply pressure to the ground, thus resulting in motion of the snowmobile 20. Several idler wheels, as will be described further below, further assist the translation of the closed-loop tracks 36 along the ground contacts 58.

Figure 5:
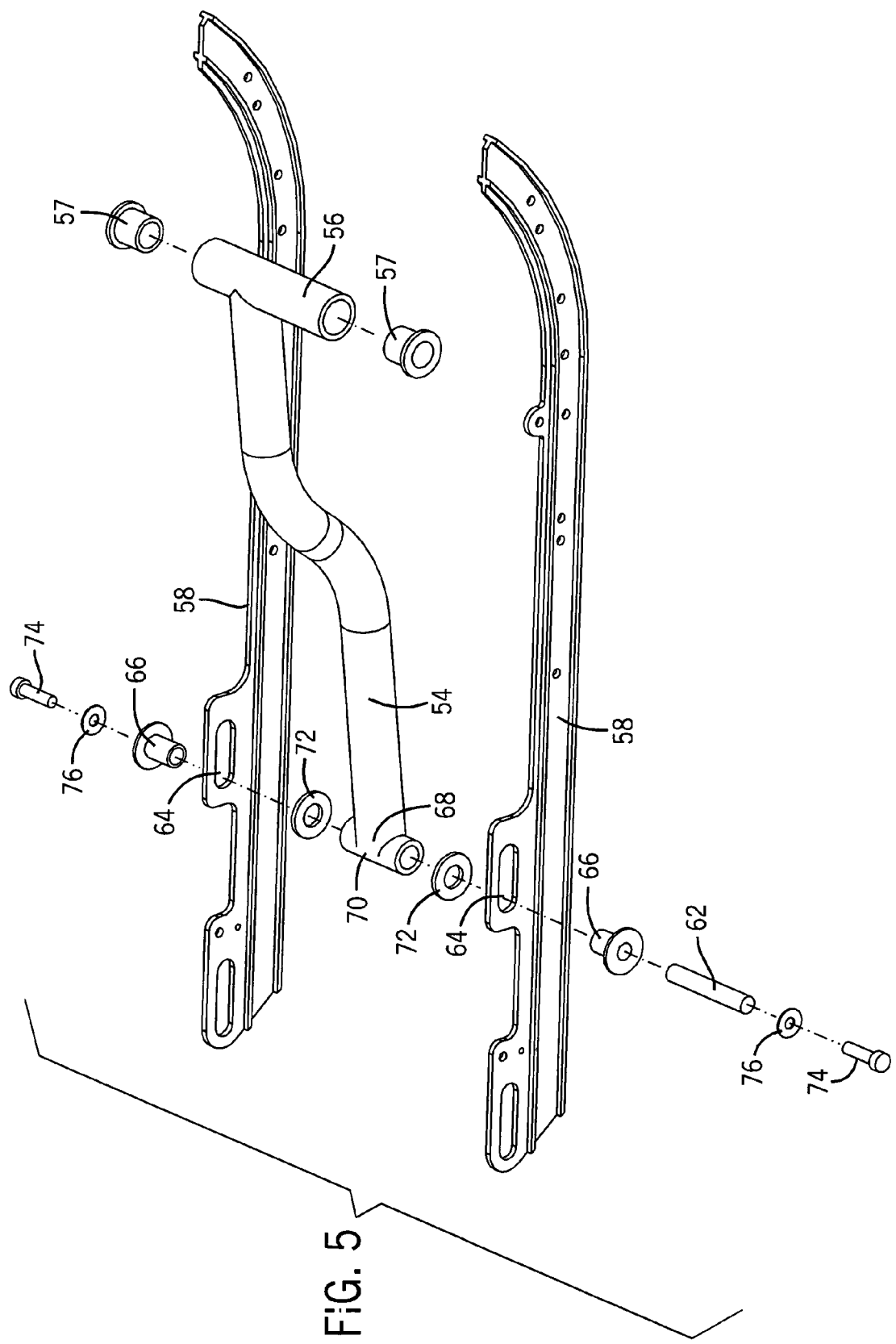
FIG. 5 is an exploded perspective view of the tensioner, swing arm and pair of elongated ground contacts.

Referring to FIGS. 3 and 5, each swing arm 54 is coupled to the pair of ground contacts 58 by a tensioner 60. The tensioner 60 comprises an elongated pin 62 disposed through elongated slots 64 formed in the pair of ground contacts 58. The rear end 68 of the swing arm 54 has a transverse sleeve 70 through which the pin 62 is disposed. A pair of inboard washers 72 are disposed on opposite sides of the transverse sleeve 70 and a pair of opposing bushings 66 are disposed on opposite outboard sides of the slots 64 in the ground contacts 58. A pair of bolts 74 and opposing outboard washers 76 rotatably secure the pin 62 to the pair of ground contacts 58 such that the swing arm 54 may rotate about the pin 62. The tensioner 60 allows the ground contacts 58 to move freely in a fore and aft direction during suspension system travel. This movement is allowed and governed by the pin 62, which slides along the slots 64. The tensioner 60 thus helps to adjust the rear suspension system 32 during suspension travel and maintain a generally uniform tension in the closed-loop track 36 as it rotates and travels along rough terrain. The tensioner 60 further helps maximize contact between the closed-loop tracks 36 and the ground being traveled. These and other aspects and purposes of the tensioner 60 will be described more fully below.

It is recognized that variations to the structure of the tensioner 60 may be employed to accomplish the same functional advantages. For example, the slots 64 may be formed in the swing arm 54 instead of in the ground contacts 58. Alternately, a single slot 64 in the swing arm 54 could be employed. In such an arrangement, the pin 62 would be attached to the ground contacts 58 and extend through the slot or slots 64 in the swing arm 54. The ground contacts 58 would thus be free to move in a fore and aft direction along the length of the slot or slots 64 during suspension travel.

Figure 10:
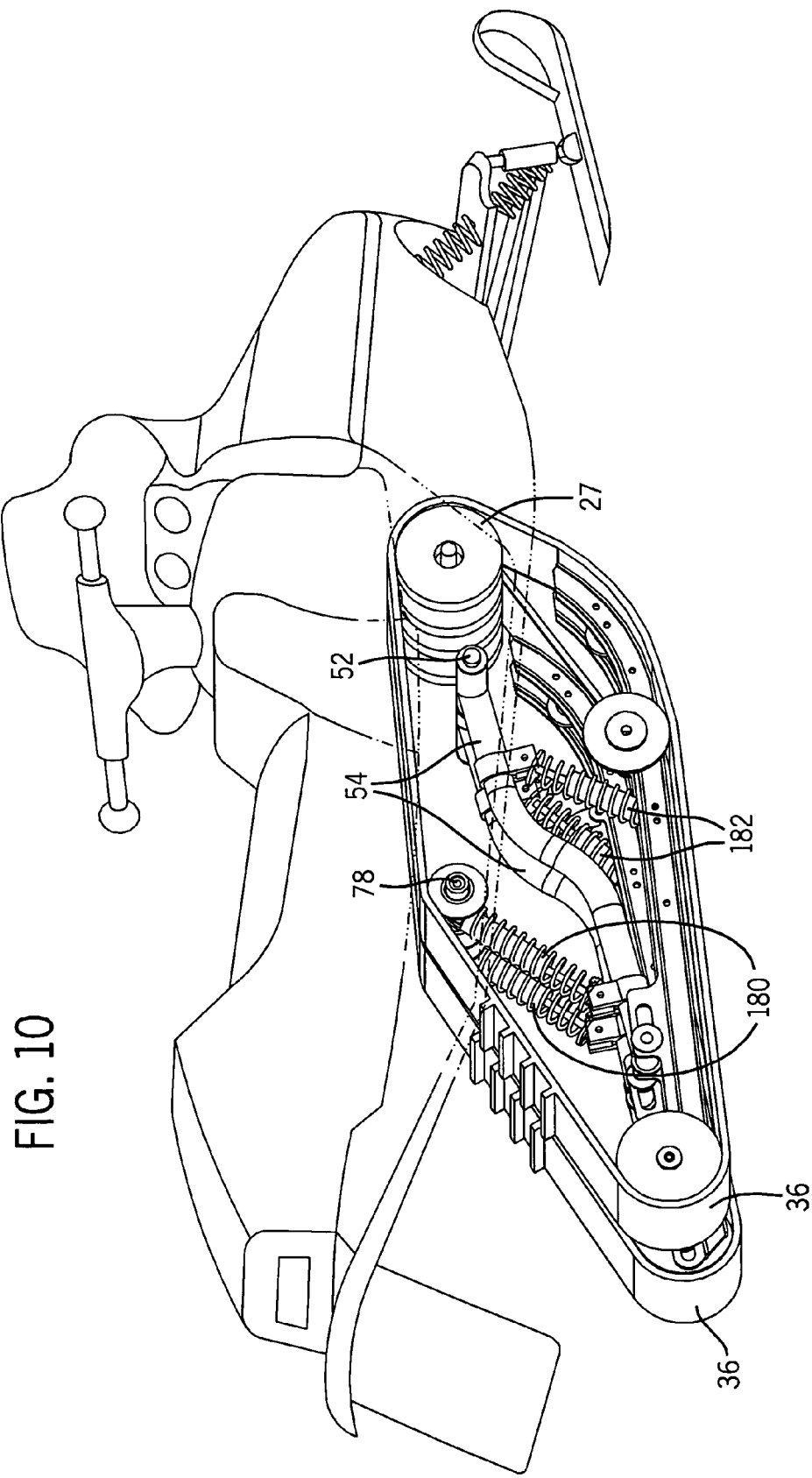
FIG. 10 is a right rear perspective view of an alternative embodiment of the rear suspension system mounted in a tunnel of a snowmobile and having coil over shock resilient members.

Referring back to FIG. 4, a rear resilient member 82 is disposed in each of the independent suspension assemblies 38. Preferably the pair of rear resilient members 82 comprise spring and shock absorbing members, which are well known and used in the art for vehicle suspension. The rear resilient member 82 may comprise any variety of known spring and/or shock members, such as ride springs, coil springs, and/or multiple types of known shock absorbers. As shown in an alternate embodiment depicted in FIGS. 10 and 11, the rear resilient member 82 comprises a coil over spring element 180.

Referring to both FIGS. 3 and 6, the rear resilient members 82 each have a first end 84 rotatably coupled to the rear cross shaft 78 and a second end 86 pivotally coupled to a clevis connector 88, which is adjustably coupled to the swing arm 54. The pair of rear resilient members 82 bias independently of each other against displacement between the rear cross shaft 78 and the swing arm 54 during rear suspension system 32 travel and resiliently support and dampen movement of the closed-loop tracks 36 to soften the ride of the snowmobile 20.

The clevis connector 88 comprises a clevis 89 which pivotably connects to the second end 86 of the rear resilient member 82, and an adjustable clamp 90 which couples the second end 86 of the rear resilient member 82 to selected positions along the swing arm 54. Adjustment of the position of the adjustable clamp 90 along the swing arm 54 changes the ride characteristics and height of the snowmobile 20. When the clevis connector 88 is positioned along the swing arm 54 towards the tensioner 60, the rear end of the snowmobile is positioned closer to the ground and ride softens. Alternately, when the clevis connector 88 is positioned along the swing arm 54 towards the upward curved portion 53, the height of the rear portion of the snowmobile is increased and the ride stiffens. Although the clevis connector 88 employs specific means for adjustably coupling the linkages to the swing arm 54, it is conceived that various mechanisms for achieving the same ends, such as screws, bolts, rack and pinions, T-slots, and various other types of mechanisms, may be employed.

Referring to FIG. 4, a front resilient member 92 is disposed in each of the independent suspension assemblies 38. Preferably the pair of front resilient members 92 comprise spring and/or shock absorbing members, which are well known and used in the art for vehicle suspension. The front resilient members 92 may comprise a variety of known spring and/or shock members, such as ride springs, coil springs, air springs, and/or multiple types of shock absorbers. In an alternative embodiment shown in FIGS. 10 and 11, the front resilient member 92 comprises a coil over spring element 182.

The front resilient members 92 have a first end 94 coupled to the swing arm 54 and a second end 96 coupled to the respective pair of ground contacts 58. Each of the front resilient members 92 bias independently of each other against displacement between the swing arm 54 and the pair of ground contacts 58 during rear suspension system 32 travel to resiliently support and dampen movement of the tracks and soften the ride of the snowmobile 20.

A clevis connector 98 pivotally couples the first end 94 of the front resilient member 92 to the swing arm 54. The clevis connector 98 comprises a clevis 99 which pivotally couples to the first end 94 of the front resilient member 92 and an adjustable clamp 100 which couples the first end 94 of the front resilient member 92 at selected positions along the swing arm 54. Adjustment of the position of the adjustable clamp 100 along the swing arm 54 adjusts ride characteristics of the snowmobile 20. Although the clevis connector 88 employs specific means for adjustably coupling the linkages to the swing arm 54, it is conceived that various mechanisms for achieving the same ends, such as screws, bolts, rack and pinions, T-slots, and multiple other types of mechanisms, may be employed.

Referring to FIGS. 4 and 7, the second end 96 of the front resilient member 92 is selectively coupled to a series of holes 102 along each pair of ground contacts 58. The second end 96 of the front resilient member 92 is held in place by a bolt (not shown), however, it is conceived that various means for providing a rotational coupling may be employed. Adjustment of the point of coupling between the second end 96 and the ground contact 58 adjusts the height and ride characteristics of the snowmobile.

The closed-loop tracks 36 are supported during rotational movement by a series of idlers rotatably attached to the ground contacts 58 and the rear cross shaft 78. The number, location and arrangement of the series of idler wheels may vary, as long as the travel of the closed-loop tracks 36 is adequately supported. In the presently described embodiment, a series of top, front, and rear idler wheels are provided.

Specifically, as shown in FIG. 6, the rear cross shaft 78 rotatably supports inboard and outboard idler wheels which rotate about the rear cross shaft 78 and provide support for the rotating closed-loop tracks 36. Specifically, left side top outboard idler wheel 104, left side top inboard idler wheel 106, right side top inboard idler wheel 108 and right side top outboard idler wheel 110 rotate about the rear cross shaft 78 and support the rotational movement of each closed-loop track 36. Opposing outboard spacers 112 retain the respective idler wheels on the cross shaft 78, which is coupled to the left and right inboard sides 23, 25 of the tunnel 34. The idler wheels are further separated by internal spacers and by the rear resilient member 82. Specifically, left side top outboard idler wheel 104 and left side top inboard idler wheel 106 are separated by the respective first end 84 of the rear resilient member 82 and spacers 114 and 115. Similarly, right side top outboard idler wheel 110 and right side top inboard idler wheel 108 are separated by the respective first end 84 of the rear resilient member 82 and spacers 114 and 115. The two pairs of inboard and outboard idler wheels 104, 106 and 108, 110 are separated by a center spacer 116.

Referring also to FIGS. 3 and 7, the rear portions 118 of each ground contacts 58 have a longitudinally elongated slot 120 in which a series of rear idler wheels are rotatably mounted and are rotatably coupled at a selected position along the slot 120 by threaded screws (not shown). Specifically, left outboard rear idler wheel 122, left rear inboard idler wheel 124, right rear inboard idler wheel 126, and right rear outboard idler wheel 128 are rotatably mounted in their respective ground contacts 58 along the slot 120.

In addition, each pair of ground contacts 58 has a front outboard idler wheel 130 and front inboard idler wheel 131 (FIG. 4) rotatably mounted thereto. Together, the rear idler wheels 122, 124, 126, 128; front idler wheels 130, 131; and top idler wheels 104, 106, 108, 110 rotatably support the pair of closed-loop tracks 36 during rotation thereof.

Turning now to FIG. 8, the operation of the independent rear suspension system 32 when the snowmobile 20 is under normal forward acceleration (see arrow 141) will be described. As the engine drives the drive system 27 in rotation, the pair of adjacent closed-loop tracks 36 are rotatably driven in a counter-clockwise direction to propel the snowmobile 20 in a forward direction 141.

In the embodiment shown in FIG. 8, as the rear suspension system 32 encounters rough terrain, the adjacent independent suspension assemblies 38a, 38b independently articulate to guide the closed-loop tracks 36, and thus the rear portion of the snowmobile 20, over the rough terrain. In the following example, the left suspension assembly 38a encounters rough terrain and independently articulates from the right suspension assembly 38b. It should be recognized that if instead, the right suspension assembly 38b encounters rough terrain, the right suspension assembly 38b independently articulates from the left suspension assembly 38a. For simplicity, the closed-loop tracks 36 have been removed in the view shown in FIG. 8.

When rough terrain is only encountered by the left closed-loop track and the left suspension assembly 38a, the left inboard and outboard ground contacts 58a respond independently from the right inboard and outboard ground contacts 58b by moving in an upward and rearward direction. This motion is independent of the right closed-loop track and right suspension assembly 38b. The various linkages described above control the independent motion of the left closed-loop track and left suspension assembly 38a.

Specifically, as left ground contacts 58a are independently forced upward and rearward by the rough terrain, the left front resilient member 92a provides resistive downward and rearward force to control the movement the left ground contacts 58a and force the left ground contacts 58a rearward. Simultaneously, the left swing arm 54a is free to rotate slightly counter-clockwise about the front cross shaft 52. The rearward travel of the left ground contacts 58a is further controlled by the left tensioner 60a, specifically left slots 64a and left pin 62a. This rearward movement of the left ground contacts 58a continues until the movement of left slots 64a is impeded by the left pin 62a, which is resiliently held in place by the left rear resilient member 82a. Simultaneously, left rear resilient member 82a is free to rotate slightly counterclockwise about the rear cross shaft 78 and also bias against the upward and rearward motion of the left ground contacts 58a. In this manner, the left suspension assembly 38a is articulated through a defined suspension travel independent from the right suspension assembly 38b and therein adequately adjusts to the rough terrain and provides a smooth ride. Once the snowmobile 20 has passed over the rough terrain, left front resilient member 92a and left rear resilient member 82a urge the left ground contacts 58a forward and downward into a selected even terrain suspension position of the snowmobile suspension system 32.

Referring to FIG. 12, stops 142 are coupled to the transverse sleeves 56 on the swing arms 54 and stops 143 are coupled to the rear cross shaft 78. Stops 142, 143 are preferably made of rubber or some similar resilient material. During suspension system travel, the stops 143 prevent the swing arm 54 from over-rotating and contacting rear cross shaft 78. Stops 143 are coupled to the rear resilient members 82 such that stops 143 rotate with the rear resilient members 82 during suspension system travel. This aspect advantageously aligns the stops 143 for proper contact with the swing arm 54 to prevent overrotation. The stops 142 are coupled to the transverse sleeve 56 prevent curved tips 59 of the ground contacts 58 from contacting the transverse sleeve 56 of swing arm 54.

The many benefits and advantages of the independent articulating nature of the present invention discussed above will thus be appreciated by those skilled in the art. For example, the ride and handling of the snowmobile will be substantially improved. When cornering, the invention allows a substantial portion of the outside closed-loop tracks to remain in contact with the ground, thus providing better traction and control. This advantageously overcomes limitations of the single-track suspensions shown in prior art, wherein during cornering the outside edge of the single track bears the entire weight of the snowmobile.

Figure 11:
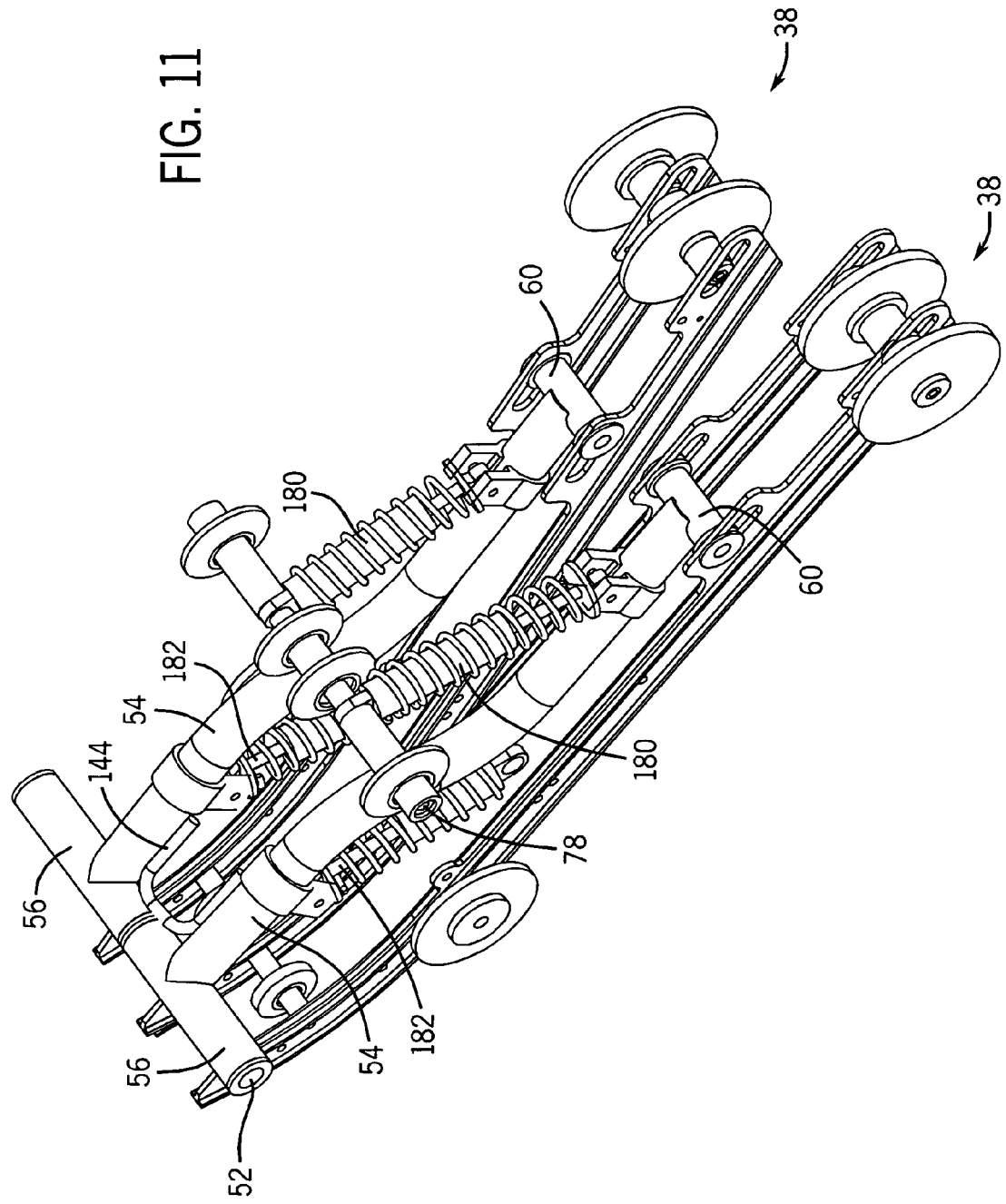
FIG. 11 is a left rear perspective view of the rear suspension system depicted in FIG. 10, having the closed-loop tracks removed therefrom.

In the alternate embodiment of the present invention shown in FIG. 11, torsion bar 144, advantageously limits the need for the snowmobile driver to lean over the vehicle to counter cornering moments and prevent the snowmobile from tipping over. Torsion bar 144 is a U-shaped member coupled to the transverse sleeves 56 of the adjacent swing arms 54. During suspension travel, torsion bar 144 distributes the force applied to a single suspension assembly across the entire suspension system. For example, as the left ground contacts 146 encounter rough terrain and begin to lift, causing the swing arm 54 to rotate about the front cross shaft 52, the torsion bar 144 causes the adjacent swing arm 54 to also rotate slightly, thus distributing moment across the suspension system.

An alternate embodiment of the present invention also provides the ability to utilize independently driven, rear closed-loop tracks. For example, the pair of closed loop tracks 36 of the present invention may be powered by a split drive system, which provides different rotational power and speed to each of the adjacent closed loop tracks 36. The relative speed of the adjacent closed-loop tracks 36 can be selected based upon drive system inputs, such as steering. In addition, the relative speed of the adjacent closed-loop tracks may also be controlled using known theories of posi-traction, wherein if one closed-loop track encounters resistance from, for example rough terrain, power is removed from the one track and provided to a remaining track or tracks. Such an arrangement further improves traction and control.

An alternate embodiment of the present invention further provides the ability to utilize independent rear braking means. Various independent braking means known in the art may be utilized with the independent rear suspension system of the present invention to improve braking ability and thus improve handling of the vehicle.

Figure 9:
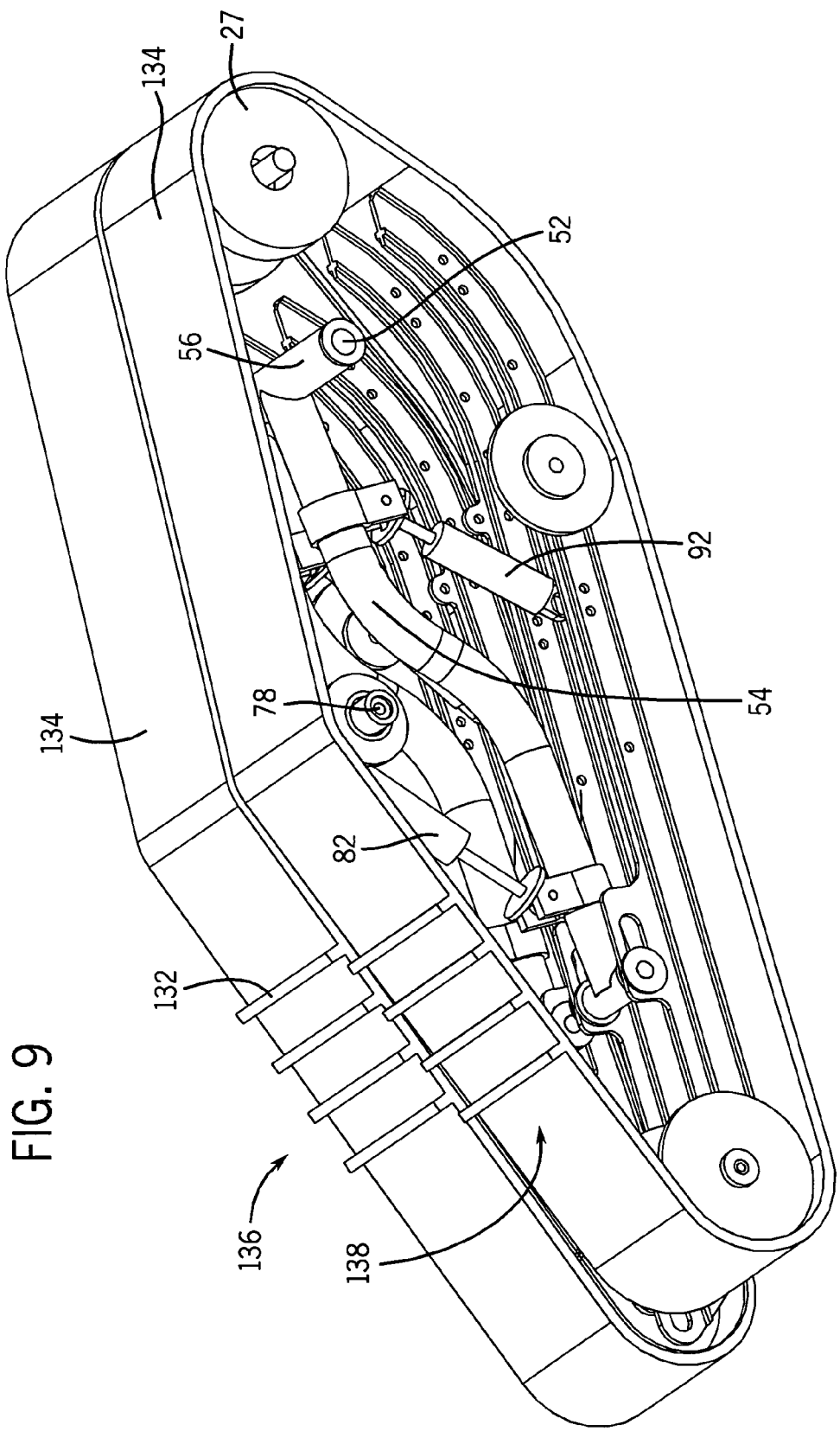
FIG. 9 is a right rear perspective view of the rear suspension system enclosed in a pair of adjacent closed-loop tracks having outer lugs formed on a portion thereof.
Figure 13:
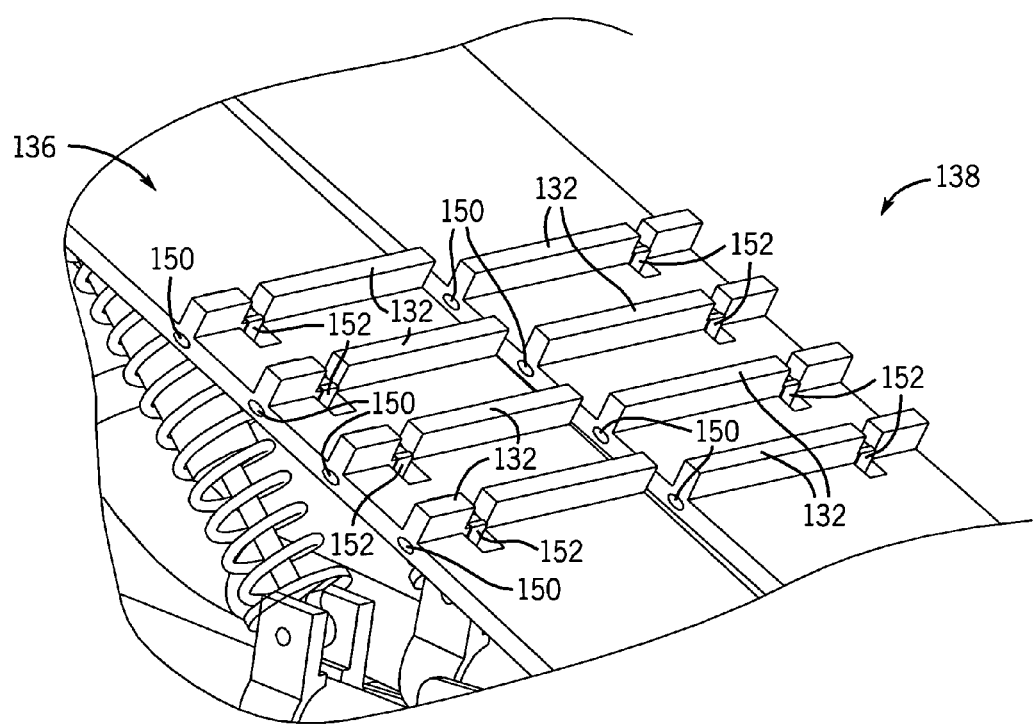
FIG. 13 is a view of outer lugs, grouser rods, and track clips on ajacent closed-loop tracks.

An alternate embodiment of the present invention further provides the ability to limit vibration and noise generated by the closed-loop tracks 36 during snowmobile 20 travel. Vibration and noise can be limited by offsetting the track lugs, grouser rods, and track clips on adjacent closed-loop tracks such that these obstructions do not contact the ground contacts 58 at the same time during rotation of the closed-loop tracks 36. For example, referring to FIGS. 9 and 13, a plurality of outer lugs 132 are disposed on the outer surface 134 of the closed-loop tracks 36. A plurality of inner grouser rods 150 are disposed on the inner surface of the closed loop tracks 36. Further each track has a plurality of track clips 152 for engaging the drive system 27. When adjacent tracks are aligned and adjacent outer lugs 132, grouser rods 150 and track clips 152 encounter the drive system and the ground contacts in unison, a significant amount of undesirable vibration is created.

According to the present invention, a first group 136 of outer lugs, grouser rods 150 and track clips 152 are offset from a second group 138 of outer lugs 132, grouser rods 150 and track clips 152 on an adjacent track. Because outer lugs 132, grouser rods 150 and track clips 152 in the first group 136 are offset from the outer lugs 132, grouser rods 150 and track clips 152 in the second group 138, during rotation each of these items encounter the adjacent suspension assemblies and the ground at different times, thus minimizing vibration and providing a smoother ride. Although the outer lugs 132, grouser rods 150 and track clips 152 are only shown on a portion of the outer surface 134 of the closed-loop tracks 36, it is recognized that these elements may extend around the entire inner and outer surfaces, or portions thereof, of the closed-loop tracks 36.

It should be understood that certain changes may be made in the design and construction set forth without departing from the spirit and scope of the invention. It is intended that all matter contained in this description and shown in the drawings be interpreted as illustrative and not in a limiting sense.

It should also be understood that the following claims are intended to cover all of the generic and specific features of the invention herein described, and all statements of the scope of the invention, which as a matter of language might be said to fall therebetween.

What is claimed is:

1. A rear suspension system for a snowmobile, the snowmobile having a chassis enclosing a drive system and a rear tunnel, said rear suspension system comprising:
    a plurality of adjacent closed-loop tracks disposed in the rear tunnel, each of said plurality of adjacent closed-loop tracks rotatably driven by the drive system;
    a plurality of independent suspension assemblies rotatably supporting said closed-loop tracks and allowing independent vertical and horizontal travel of said closed-loop tracks, one of said plurality of independent suspension assemblies disposed in each closed-loop track;
    a front elongated cross shaft extending transversely through said plurality of adjacent closed-loop tracks and coupled to the chassis, said plurality of independent suspension assemblies coupled to said front cross shaft, wherein said front elongated cross shaft provides a centerline of rotation for said plurality of independent suspension assemblies; and
    a rear elongated cross shaft extending transversely through said plurality of closed-loop tracks and coupled to the chassis, said plurality of independent suspension assemblies coupled to said rear elongated cross shaft, wherein said rear elongated cross shaft remains stationary relative to said independent suspension assemblies during suspension system travel and provides a centerline of rotation for said plurality of independent suspension assemblies.

2. The rear suspension system of claim 1, wherein said plurality of adjacent closed-loop tracks are rotatably driven by a single drive system.

3. The rear suspension system of claim 1, further comprising:
    a plurality of elongated ground contacts, at least one of said plurality of elongated ground contacts coupled to each of said plurality of independent suspension assemblies.

4. The rear suspension system of claim 1, further comprising:
    a plurality of elongated ground contacts, at least one of said plurality of elongated ground contacts coupled to each of said plurality of independent suspension assemblies; and
    a plurality of elongated swing arms, at least one of said plurality of elongated swing arms disposed in each of said plurality of independent suspension assemblies, a first end of each of said plurality of elongated swing arms transversely pivotably coupled to said front elongated cross shaft and a second end of each of said plurality of elongated swing arms coupled to said at least one of said plurality of elongated ground contacts.

5. The rear suspension system of claim 4, further comprising:
    at least one torsion bar, said torsion bar coupled to a first and second swing arm of said plurality of elongated swing arms to distribute moment applied to a single suspension assembly across the rear suspension system.

6. The rear suspension system of claim 1, further comprising:
    a plurality of tensioners, at least one of said plurality of tensioners disposed in each of said independent suspension assemblies, said plurality of tensioners extendible and retractable independent of each other during movement of said plurality of independent suspension assemblies, said plurality of tensioners maintaining said plurality of closed loop tracks at a generally uniform tension during said movement.

7. The rear suspension system of claim 1, further comprising:
    a first group of grouser rods disposed on a first track of said plurality of tracks; and
    a second group of grouser rods disposed on a second track of said plurality of tracks;
    wherein said first group of grouser rods on said first track are offset from said second group of grouser rods on said second track to reduce vibration created from said first and second groups of grouser rods during suspension travel.

8. The rear suspension system of claim 1, further comprising:
a first group of track clips disposed on a first track of said plurality of tracks; and
a second group of track clips disposed on a second track of said plurality of tracks;
wherein said first group of track clips on said first track are offset from said second group of track clips on said second track to reduce vibration created from said first and second groups of track clips during suspension travel.

9. The rear suspension system of claim 1, further comprising:
a first group of outer lugs disposed on a first track of said plurality of tracks; and
a second group of outer lugs disposed on a second track of said plurality of tracks;
wherein said first group of outer lugs on said first track are offset from said second group of outer lugs on said second track, to reduce vibration created by said first and second groups of outer lugs during suspension travel.

10. A rear suspension system for a snowmobile, the snowmobile having a chassis enclosing a drive system and a rear tunnel, said rear suspension system comprising:
a plurality of adjacent closed-loop tracks disposed in the rear tunnel, each of said plurality of adjacent closed-loop tracks rotatably driven by the drive system;
a plurality of independent suspension assemblies rotatably supporting said closed-loop tracks and allowing independent vertical and horizontal travel of said closed-loop tracks, one of said plurality of independent suspension assemblies disposed in each closed-loop track;
a front elongated cross shaft extending transversely through said plurality of adjacent closed-loop tracks and coupled to the chassis, said plurality of independent suspension assemblies coupled to said front cross shaft, wherein said front elongated cross shaft provides a centerline of rotation for said plurality of independent suspension assemblies;
a plurality of elongated ground contacts, at least one of said plurality of elongated ground contacts coupled to each of said plurality of independent suspension assemblies; and
a plurality of elongated swing arms, at least one of said plurality of elongated swing arms disposed in each of said plurality of independent suspension assemblies, a first end of each of said plurality of elongated swing arms transversely pivotably coupled to said front elongated cross shaft and a second end of each of said plurality of elongated swing arms coupled to said at least one of said plurality of elongated ground contacts;
wherein said at least one of said plurality of elongated swing arms comprises a downward curved portion and a rearward curved portion.

11. The rear suspension system of claim 10, further comprising:
a plurality of tensioners, at least one of said plurality of tensioners adjustably coupling said second end of said at least one of said plurality of elongated swing arms to said at least one elongated ground contact, said plurality of tensioners extendible and retractable independent of each other during movement of said plurality of independent suspension assemblies.

12. A rear suspension system for a snowmobile, the snowmobile having a chassis enclosing a drive system and a rear tunnel, said rear suspension system comprising:
a plurality of adjacent closed-loop tracks disposed in the rear tunnel, each of said plurality of adjacent closed-loop tracks rotatably driven by the drive system;
a plurality of independent suspension assemblies rotatably supporting said closed-loop tracks and allowing independent vertical and horizontal travel of said closed-loop tracks, one of said plurality of independent suspension assemblies disposed in each closed-loop track;
a front elongated cross shaft extending transversely through said plurality of adjacent closed-loop tracks and coupled to the chassis, said plurality of independent suspension assemblies coupled to said front cross shaft, wherein said front elongated cross shaft provides a centerline of rotation for said plurality of independent suspension assemblies;
a plurality of elongated ground contacts, at least one of said plurality of elongated ground contacts coupled to each of said plurality of independent suspension assemblies;
a plurality of elongated swing arms, at least one of said plurality of elongated swing arms disposed in each of said plurality of independent suspension assemblies, a first end of each of said plurality of elongated swing arms transversely pivotably coupled to said front elongated cross shaft and a second end of each of said plurality of elongated swing arms coupled to said at least one of said plurality of elongated ground contacts;
a plurality of tensioners, at least one of said plurality of tensioners adjustably coupling said second end of said at least one of said plurality of elongated swing arms to said at least one elongated ground contact, said plurality of tensioners extendible and retractable independent of each other during movement of said plurality of independent suspension assemblies; and
an elongated pin disposed through a plurality of longitudinally elongated slots formed in said plurality of elongated ground contacts, wherein said second end of said at least one swing arm is pivotably coupled to said elongated pin and said plurality of elongated ground contacts are free to move in a forward and rearward direction along the length of said slots.

13. A rear suspension system for a snowmobile, the snowmobile having a chassis enclosing a drive system and a rear tunnel, said rear suspension system comprising:
a plurality of adjacent closed-loop tracks disposed in the rear tunnel, each of said plurality of adjacent closed-loop tracks rotatably driven by the drive system;
a plurality of independent suspension assemblies rotatable supporting said closed-loop tracks and allowing independent vertical and horizontal travel of said closed-loop tracks, one of said plurality of independent suspension assemblies disposed in each closed-loop track;
a front elongated cross shaft extending transversely through said plurality of adjacent closed-loop tracks and coupled to the chassis, said plurality of independent suspension assemblies coupled to said front cross shaft, wherein said front elongated cross shaft provides a centerline of rotation for said plurality of independent suspension assemblies;

a plurality of elongated ground contacts, at least one of said plurality of elongated ground contacts coupled to each of said plurality of independent suspension assemblies;

a plurality of elongated swing arms, at least one of said plurality of elongated swing arms disposed in each of said plurality of independent suspension assemblies, a first end of each of said plurality of elongated swing arms transversely pivotably coupled to said front elongated cross shaft and a second end of each of said plurality of elongated swing arms coupled to said at least one of said plurality of elongated ground contacts; and a plurality of front resilient members, at least one of said front resilient members disposed in each of said independent suspension assemblies, said at least one front resilient member having a first end coupled to said at least one elongated swing arm and a second end coupled to said at least one elongated ground contact, wherein each of said plurality of front resilient members bias independently of each other against displacement between said plurality of elongated swing arms and said plurality of elongated ground contacts during rear suspension system travel.

14. The rear suspension system of claim 13, wherein each of said plurality of suspension assemblies further comprise:

a clevis connector, said clevis connector pivotably coupling said first end of said at least one front resilient member to said at least one elongated swing arm.

15. The rear suspension system of claim 14, wherein said clevis connector comprises an adjustable clamp, said adjustable clamp adjustably coupling said first end of said at least one front resilient member at selected positions along said at least one elongated swing arm, wherein adjustment of said adjustable clamp adjusts ride characteristics of the snowmobile.

16. The rear suspension system of claim 13, wherein said at least one ground contact has a plurality of apertures formed therethrough for adjustably coupling said second end of said at least one front resilient member at selected positions along said at least one elongated ground contact.

17. A rear suspension system for a snowmobile, the snowmobile having a chassis enclosing a drive system and a rear tunnel, said rear suspension system comprising:

a plurality of adjacent closed-loop tracks disposed in the rear tunnel, each of said plurality of adjacent closed-loop tracks rotatably driven by the drive system;

a plurality of independent suspension assemblies rotatably supporting said closed-loop tracks and allowing independent vertical and horizontal travel of said closed-loop tracks, one of said plurality of independent suspension assemblies disposed in each closed-loop track;

a front elongated cross shaft extending transversely through said plurality of adjacent closed-loop tracks and coupled to the chassis, said plurality of independent suspension assemblies coupled to said front cross shaft, wherein said front elongated cross shaft provides a centerline of rotation for said plurality of independent suspension assemblies;

a plurality of elongated ground contacts, at least one of said plurality of elongated ground contacts coupled to each of said plurality of independent suspension assemblies;

a plurality of elongated swing arms, at least one of said plurality of elongated swing arms disposed in each of said plurality of independent suspension assemblies, a first end of each of said plurality of elongated swing arms transversely pivotably coupled to said front elongated cross shaft and a second end of each of said plurality of elongated swing arms coupled to said at least one of said plurality of elongated ground contacts;

a rear elongated cross shaft extending transversely through said plurality of closed-loop tracks and coupled to the chassis, said plurality of independent suspension assemblies coupled to said rear elongated cross shaft, wherein said rear elongated cross shaft provides a center line of rotation for said plurality of independent suspension assemblies; and a plurality of rear resilient members, at least one of said rear resilient members disposed in each of said independent suspension assemblies, said at least one rear resilient member having a first end coupled to said rear elongated cross shaft and a second end coupled to said at least one swing arm, wherein each of said plurality of rear resilient members bias independently of each other against displacement between said rear elongated cross shaft and said plurality of elongated swing arms during rear suspension system travel.

18. The rear suspension system of claim 17, wherein each of said plurality of independent suspension assemblies further comprise:

a clevis connector pivotably coupling said second end of said at least one rear resilient member to said at least one elongated swing arm.

19. The rear suspension system of claim 18, wherein said clevis connector comprises an adjustable clamp, said adjustable clamp adjustably coupling said second end of said at least one rear resilient member at selected positions along said at least one elongated swing arm, wherein adjustment of said adjustable clamp changes ride characteristics and height of the snowmobile.

20. A rear suspension system for a snowmobile, the snowmobile having a chassis enclosing a drive system and a rear tunnel, said rear suspension system comprising:

a plurality of adjacent closed-loop tracks disposed in the rear tunnel, each of said plurality of adjacent closed-loop tracks rotatably driven by the drive system;

a plurality of independent suspension assemblies rotatably supporting said closed-loop tracks and allowing independent vertical and horizontal travel of said closed-loop tracks, one of said plurality of independent suspension assemblies disposed in each closed-loop track;

a front elongated cross shaft extending transversely through said plurality of adjacent closed-loop tracks and coupled to the chassis, said plurality of independent suspension assemblies coupled to said front cross shaft, wherein said front cross shaft provides a centerline of rotation for said plurality of independent suspension assemblies;

a rear elongated cross shaft extending transversely through said plurality of closed-loop tracks and coupled to the chassis, said plurality of independent suspension assemblies coupled to said rear elongated cross shaft, wherein said rear elongated cross shaft provides a centerline of rotation for said plurality of independent suspension assemblies;

a plurality of elongated ground contacts, at least one of said plurality of elongated ground contacts coupled to each of said plurality of independent suspension assemblies;

a plurality of elongated swing arms, at least one of said plurality of elongated swing arms disposed in each of said plurality of independent suspension assemblies, a first end of each of said plurality of elongated swing arms transversely pivotably coupled to said front elongated cross shaft and a second end of each of said plurality of elongated swing arms coupled to said at least one of said plurality of elongated ground contacts;

a plurality of front resilient members, at least one of said front resilient members disposed in each of said independent suspension assemblies, said at least one front resilient member having a first end coupled to said at least one elongated swing arm and a second end coupled to said at least one elongated ground contact, wherein each of said plurality of front resilient members bias independently of each other against displacement between said plurality of elongated swing arms and said plurality of elongated ground contacts during rear suspension system travel; and a plurality of rear resilient members, at least one of said rear resilient members disposed in each of said independent suspension assemblies, said at least one rear resilient member having a first end coupled to said rear elongated cross shaft and a second end coupled to said at least one swing arm, wherein each of said plurality of rear resilient members bias independently of each other against displacement between said rear elongated cross shaft and said plurality of elongated swing arms during rear suspension system travel.

21. A rear suspension system for a snowmobile, the snowmobile having a chassis enclosing a drive system and a rear tunnel, said rear suspension system comprising:

a plurality of adjacent closed-loop tracks disposed in the rear tunnel, each of said plurality of adjacent closed-loop tracks rotatably driven by the drive system; and an independent suspension assembly entirely disposed in each closed-loop track, said suspension assemblies rotatably supporting said closed-loop tracks and allowing independent vertical and horizontal travel of said closed-loop tracks.

22. The rear suspension system of claim 21, further comprising a front elongated cross shaft extending transversely through said plurality of adjacent closed-loop tracks and coupled to the chassis, said plurality of independent suspension assemblies coupled to said front cross shaft, wherein said front cross shaft provides a center line of rotation for said plurality of independent suspension assemblies.

23. The rear suspension system of claim 21, further comprising:

a plurality of tensioners, at least one of said plurality of tensioners disposed in each of said independent suspension assemblies, said plurality of tensioners extendable and retractable independent of each other during movement of said plurality of independent suspension assemblies, said plurality of tensioners maintaining said plurality of closed-loop tracks at a generally uniform tension during said movement.

* * * * *